(12) United States Patent
Suzuki et al.

(10) Patent No.: US 7,107,517 B1
(45) Date of Patent: Sep. 12, 2006

(54) METHOD FOR PROCESSING LINKS AND DEVICE FOR THE SAME

(75) Inventors: Toshimitsu Suzuki, Kawasaki (JP); Kazumi Saito, Kawasaki (JP); Sadao Yashiro, Kawasaki (JP); Takahide Muramoto, Kawasaki (JP); Masatomo Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/414,942

(22) Filed: Oct. 8, 1999

(30) Foreign Application Priority Data

Oct. 30, 1998 (JP) ................................ 10-311380

(51) Int. Cl.
*G06F 15/00* (2006.01)

(52) U.S. Cl. .................. 715/501.1; 715/511; 715/513; 715/526

(58) Field of Classification Search ................ 715/512, 715/513, 501.1, 511, 526
See application file for complete search history.

(56) References Cited

U.S. PATENT DOCUMENTS

| | | | | |
|---|---|---|---|---|
| 5,809,317 A | * | 9/1998 | Kogan et al. | 715/501.1 |
| 5,822,539 A | * | 10/1998 | van Hoff | 709/236 |
| 5,848,407 A | * | 12/1998 | Ishikawa et al. | 707/2 |
| 6,029,180 A | * | 2/2000 | Murata et al. | 715/501.1 |
| 6,175,843 B1 | * | 1/2001 | Muramoto et al. | 715/513 |
| 6,209,006 B1 | * | 3/2001 | Medl et al. | 715/501.1 |
| 6,282,548 B1 | * | 8/2001 | Burner et al. | 707/104.1 |
| 6,292,813 B1 | * | 9/2001 | Wolfe | 715/513 |
| 2001/0034814 A1 | * | 10/2001 | Rosenzweig | 711/118 |
| 2002/0124055 A1 | * | 9/2002 | Reisman | 709/218 |

FOREIGN PATENT DOCUMENTS

| | | |
|---|---|---|
| JP | H07-37058 | 2/1995 |
| JP | 7-282079 | 10/1995 |
| JP | 9-259028 | 10/1997 |
| JP | H10-111873 | 4/1998 |
| JP | H10-222523 | 8/1998 |
| JP | H10-269049 | 10/1998 |

OTHER PUBLICATIONS

Office Action from Japanese Patent Office dated Sept. 27, 2005, issued for the priority Application No. H10-311380 (1pg) and Office Action from Japanese Patent Office dated Oct. 14, 2005, issued for the divisional Application No. 2002-285958 (3pgs).

* cited by examiner

*Primary Examiner*—Stephen Hong
*Assistant Examiner*—Matt Ludwig
(74) *Attorney, Agent, or Firm*—Staas & Halsey LLP

(57) ABSTRACT

A link-processing device for displaying a summary of linked information before the link is called up is disclosed. The link processing device includes an acquisition module, an extracting module, and a displaying module. The acquisition module acquires structured information containing: link-generating information for generating links between multiple resources; and predetermined supplemental information indicating characteristics of the resource. A setting is provided for whether all resources are to be acquired or not. Based on this setting at least one resource is acquired and displayed. If all resources are to be acquired, the extracting module extracts a section of each resource except for the resource display object and/or extracts from the structured information supplemental information regarding each resource except for the resource display object. If any of the resources have been acquired, supplemental information for each of the resources other than the acquired resources is extracted from the structured information. The displaying module displays extracted information for each resource.

28 Claims, 13 Drawing Sheets

EMBEDDED DISPLAY OF SUPPLEMENTAL INFORMATION

Display Example
  This page is a sample display. The underlined section is a link. For example, Fujistu (copyright) represents a link.

EMBEDDED DISPLAY OF PART OF A RESOURCE

Display Example
  This page is a sample display. The underlined section is a link. For example, Fujistu (This is Fujitsu's···) represents a link.

Fig. 2

```
                              ⎧ <link href="www.fujitsu.co.jp"
LINK-GENERATING INFORMATION  ⎨        show="new"
                              ⎩        behavior="Reference"
                              ⎧        title="Fujitsu's Home Page"
                              ⎪        tag="Taro Fujitsu"
                              ⎪        copyright="Copyright Fujitsu Ltd."
                              ⎪        trademark="Fujitsu.gif"
SUPPLEMENTAL INFORMATION     ⎨        user-info="Information Concerning XML"
                              ⎪        uri-id="Copyright"
                              ⎪        uri-mark="trademark"
                              ⎩        >Fujitsu</link>
```

Fig. 3

```
<? XML version=1.0 ?>

<!-- Below is a section showing meta information-->
<rdf:RDF>
    <rdf:Description about="http://www.fujitsu.com/Home/Patent">
        <s:Publisher>Fujitsu Labs</s:Publisher>
        <s:Title>Structuaized Document Processing</s:Title>
        <s:Creator>Toshimitsu Suzuki</s:Creator>
        <s:Date>Octorber 3, 1998</s:Date>
    </rdf:Description>
</rdf:RDF>

<!-- Text data below-->
<doc>
    <title>Structuralized Document Processing</title>
    <abst>Abstract</abst>
    <chap>
        <title>Foreword</title>
            <para> This manuscript is about structured documents...</para>
            <para>An especially important point is that<emph>structuralized documents
                are.../emph>As long as this point is given attention···. </para>
            .........
    </chap>

<chap>
        <title>What is XML</title>
            <para>In this chapter···.. </para>
            <caution> Caution: Differnces between SGML andXML</caution>
<para>The difference between SGML and XML is ···
            </para>
            .........
    </chap>

<chap>
        <title>Fields of Use</title>
            <para> ·········</para>
            .........
    </chap>

<chap>
        <title>Application</title>
            <para> ······.</para>
    </chap>

<chap>
        <title> Conclusion</title>
            <para>···... </para>
    </chap>
</doc>
```

Fig. 4

| LOCATOR INFORMATION | DISPLAY STATUS | CALL-UP COUNT |
|---|---|---|
| uri1 | DISPLAY | 1 |
| uri2 | DISPLAY | 1 |
| uri3 | NON-DISPLAY | 0 |
| ⋮ | ⋮ | ⋮ |

Fig. 5

(a) EMBEDDED DISPLAY OF SUPPLEMENTAL INFORMATION

Display Example
 This page is a sample display.
The underlined section is a link.
For example, Fujistu (copyright)
represents a link.
......................
..........................

(b) EMBEDDED DISPLAY OF PART OF A RESOURCE

Display Example
 This page is a sample display.
The underlined section is a link.
For example, Fujistu (This is
Fujitsu's...) represents a link.
......................
..........................

Fig. 7
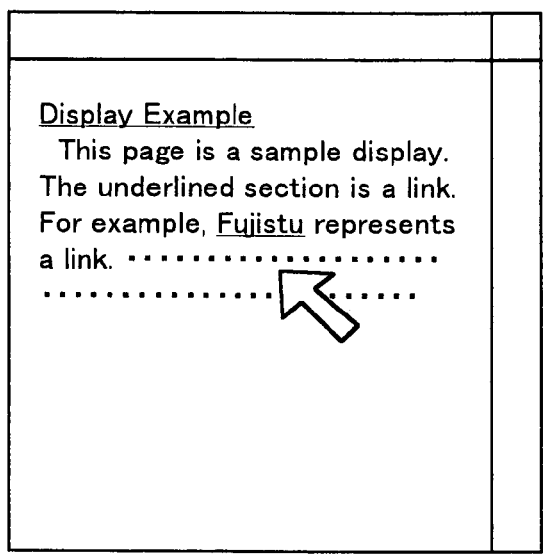
(a) Original screen
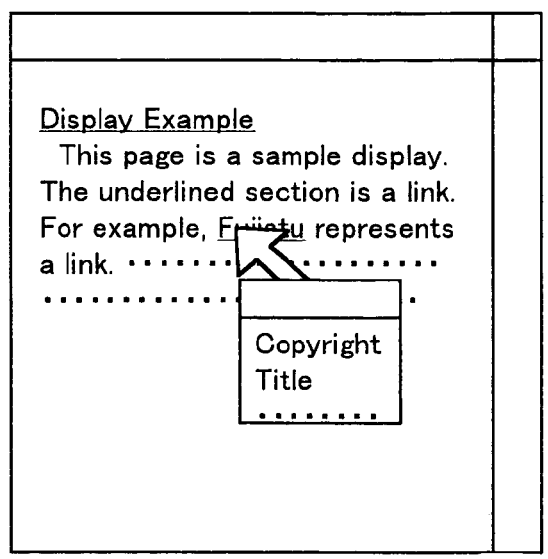
(b) Screen with window displayed

Display Screen

Fig. 10

| | | |
|---|---|---|
| Link destination list | | |
| www.foo.com | Reference | Taro Yamada |
| www.lab.com | Reference | Hanako Suzuki |
| www.xxx.com | Citation | Takashi Fujisan |
| ......... | | |

(a) Multiple Information Display Example

| | | |
|---|---|---|
| Link destination list | | |
| www.foo.com | Call-up count | 5 |
| www.lab.com | Call-up count | 2 |
| www.xxx.com | Call-up count | 7 |
| ......... | | |

(b) Call-up Count Display Example

Fig. 11
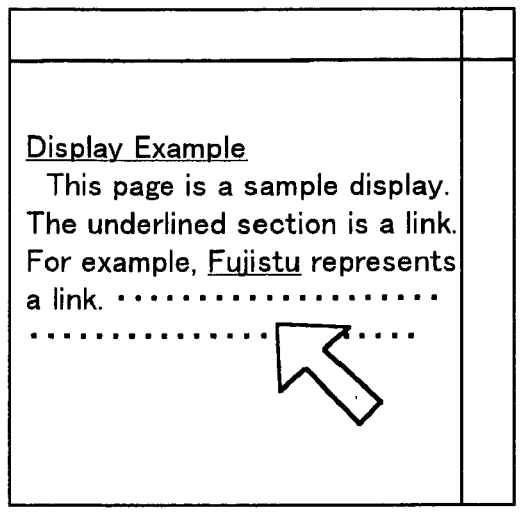
Original screen
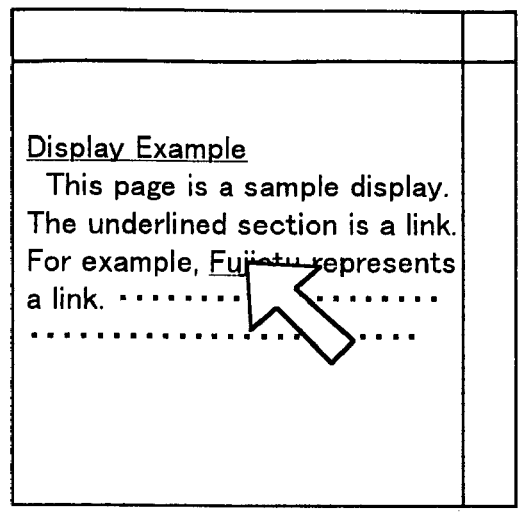
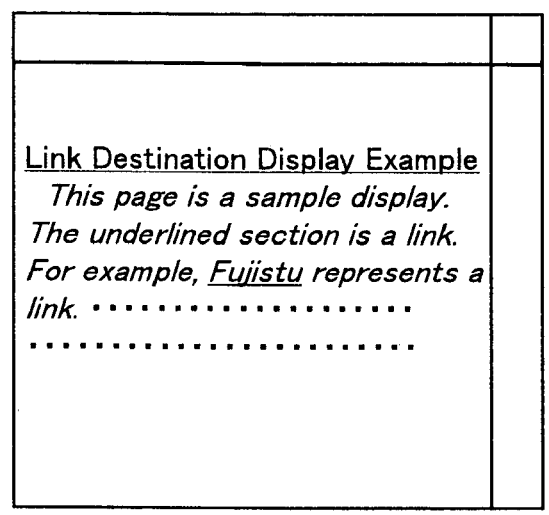
Link destination screen

Fig. 13

Display Example
This page is a sample display. The underlined section is a link. For example, Fujistu represents a link. ························
···························

METHOD FOR PROCESSING LINKS AND DEVICE FOR THE SAME

BACKGROUND OF THE INVENTION

1. Technical Field

The present invention relates to technology for easily and efficiently referencing hyperlinks within a current structured document or between it and other structured documents while, for example, the current structured document is being displayed or edited.

In the present invention, "structured document" means electronic document information that has been structuralized based upon predetermined structural elements, and described in languages such as SGML (Standard Generalized Markup Language, ISO 8879:1986) and XML (extensible Markup Language, W3C recommendation).

A "resource," furthermore, indicates a denotable unit of information or services assigned to a link. All or an arbitrary portion of a structured document or non-structured document can be a resource. Specific examples of resources include files containing text data and image data, pictures, text documents, programs, and query results.

"Non-structured document" means electronic document information that has not been structuralized, such as standard text data, image data, and bitmap data.

"Linking" signifies the interrelating of a plurality of resources. By actuating the applicable place within the resources of a link source—for example, by selecting a word and double-clicking that selection with a mouse—a user can traverse ("jump") to the linked resource. The "displayability" of a structured document signifies the ability of the contents of a structured document described in accordance with standards such as the above-noted SGML and XML to be output visually.

2. Description of Related Art

With the rapid growth of the Internet in recent years, it has become possible to refer to various types of information easily by linking different information to a single web page. Information linked to other information is displayed using different font colors, underlining, bordering, or the like, to distinguish it from information that is not linked to other information. Of these display methods, FIG. 13 shows an example wherein underlining is used in the display. The user is able to recognize the presence of a link from the underlining and can call up the linked resource by actuating that place.

However, even if the user can recognize the presence of a link to other information in a document being displayed, the user cannot tell, for example, what kind of information is at the linked resource, what the relationship between the linked items is, without actually displaying the linked resource. Also, the user cannot know whether the information at the linked resource actually exists. Furthermore, wherein a link destination refers to a document in part, the user cannot confirm what section of the link destination document is being referenced and cannot be edited, nor which sections, not being referenced, are passages in the original that can be edited.

Also, while users can easily create a wide variety of links, this also means that it is easy to link any information to third parties' web pages. In such cases, before referring to—i.e., "going/jumping to"—the linked information, the user cannot know information such as where the link destination is and who the author of the linked information is. Furthermore, in cases of reusing linked resource information, problems may arise with linked information copyrights. However, the existence of copyrights or trademarks on the linked information is not indicated to the user until the user goes to the link destination.

Furthermore, referring to linked information requires performing operations such as clicking a mouse each time. Thus, referring to linked information takes time and reaching desired information can be time-consuming.

SUMMARY OF THE INVENTION

In a first aspect of the present invention, the problems described above are addressed by providing a method for processing links in structured documents, used in a display device capable of displaying structured documents structured based on predetermined structural elements.

This method for processing links, includes the following steps:

(A) preparing structured information containing link-generating information and predetermined supplemental information, the link-generating information being used to generate links between information resources (hereinafter referred to as resources) out of a set of information resources in the form of all or part of the structured documents or non-structured documents, and the predetermined supplemental information indicating characteristics of the resources;

(B) selecting and displaying at least one of the resources; and (C) extracting from the structured information at least the supplemental information from the resources other than the displayed resource and displaying, along with the displayed resource, the supplemental information for each resource at a predetermined timing.

The structured information containing the link-generating information can be a structured document separate from the resource, or it can be contained in a section of the resource. The link-generating information is information needed to generate links between resources and contains at least locator information that indicates the location of the resource. The supplemental information is information indicating the characteristics of the resource and can include, for example, resource titles and resource authors. The timing at which the supplemental information is to be displayed can be when one of the resources is displayed or when the cursor is positioned to the link area in the displayed resource.

The present invention in another aspect is a link-processing device in a structured document used in a display device capable of displaying structured documents structured based on predetermined structural elements. This aspect of the invention provides a device for displaying resource information including: first means for acquiring; second means for acquiring; first means for extracting; second means for extracting; and means for outputting.

The first means for acquiring acquires structured information containing link-generating information and predetermined supplemental information. The link-generating information is used to generate links between information resources (hereinafter referred to as resources) out of a set of information resources in the form of all or part of the structured documents or non-structured documents. The predetermined supplemental information indicates characteristics of the resources. The second means for acquiring handles a setting for determining whether all the resources are to be acquired or not, acquires at least one resource according to the setting, and sends the acquired resource to the display device to be displayed.

If all of the resources have been acquired, the first means for extracting extracts at least a section of each of the resources other than the displayed resource and/or extracts from the structured information at least the supplemental information of each of the resources other than the displayed resource. If one resource of the resources is acquired, the second means for extracting extracts from the structured information at least the supplemental information of each of the resources other than the acquired resource. The means for outputting visually outputs a section of the extracted resource and/or the supplemental information for each of the resources.

The first acquisition means acquires structured information containing link-generating information and supplemental information. If a setting indicates that all the resources are to be acquired, the second acquisition means acquires all resources and selects one of the resources to be the resource display object. Otherwise, an appropriate selection criterion is used to select one of the resources. The selected resource is acquired and becomes the resource display object. For example, a resource specified during linking to be automatically displayed can be selected. Alternatively, the first resource indicated in the structured document can be selected.

If all resources have been acquired, the first extracting means (1) extracts a section from each resource except for the resource display object; and/or (2) extracts from the structured information supplemental information for one of the resources not including the resource display object. The information extracted in (1) can, for example, be a fixed amount of information at the start of the resource or link information if link information is embedded in the resource. For (2), if there are multiple types of supplemental information, the supplemental information to extract can be set appropriately.

If one of the resources has been acquired and displayed, the second extracting means extracts the supplemental information for the resources other than that resource from the structured information. The first and second extracting means can extract information other than the supplemental information. For example, resource locator information can be extracted from link-generating information, a resource author name can be extracted from the supplemental information, and the two can be coordinated and sent to outputting means.

The outputting means displays all or part of the extracted resource or supplemental information on the screen for each resource. The user views the displayed supplemental information and can know the type of resource before the resource is viewed.

The present invention in a third aspect is a link-processing device as described in accordance with the second aspect of the invention, further including means for composition information extracted by the first or second extracting means with the resource display object and sending the results to the displaying device.

The composition means composes extracted information such as supplemental information with a resource display object, and the composed data is sent to the display device. The display device embeds the extracted information in the resource.

The present invention in a fourth aspect is a link-processing device as described above with regard to the second aspect, further including selecting means for generating a list of information extracted by the first or second extracting means, for sending the list to outputting means, for handling selection of a resource, and for notifying the second acquisition means of the selected resource. The second acquisition means acquires the resource indicated in the notification if the resource has not been acquired, and sends the resource indicated in the notification to the displaying device.

For example, if the extracted information is the title and author of the resource, the selecting means generates a list that associates the title and the author for each resource. The generated list is sent to outputting means and is displayed using windows, frames, balloons, or the like. When a resource is selected from the displayed list, the selecting means notifies acquisition means of the selected resource. If acquisition means has not acquired the selected resource, the second acquisition means acquires the resource. If all resources are acquired, second acquisition means does not acquire the resource again. The selected resource is then sent to displaying means.

In a fifth aspect the present invention is a link-processing device as in the description of the second aspect, further including: means for storing a call-up count for the resource in coordination with the resource; and log administration means for sending to outputting means the call-up counts for the resources other than the resource display object, for handling selection of one of the resources, for notifying the second acquisition means of the selected resource, and for updating the call-up count for the resource in storing means. The second acquisition means acquires a resource indicated in the notification from the log administration means if the resource has not been acquired and sends the resource indicated in the notification to the display device.

The log-managing means generates a list of resource call-up counts and sends it to outputting means. When a resource is selected, log-managing means notifies second acquisition means of the selected resource and also updates the call-up count for the selected resource. The user can select the resource based on the call-up count. This is useful particularly when there is more than one link. "Call-up" can refer not only to displaying the entire resource but also to displaying an extracted section of the resource.

The present invention in a sixth aspect is a link-processing device as described in the second aspect, but furthermore wherein the first and second extracting means are capable of extracting the supplemental information together with the link-generating information.

For example, locator information can be extracted in coordination with the supplemental information.

The present invention in a seventh aspect is a link-processing device as described in the second aspect, but furthermore wherein the supplemental information contains information indicating the significance of resources linked to the resource.

Information indicating significance attached to resources can be, for example, information showing reference links or cross-reference links.

The present invention in an eighth aspect is a link-processing device as described in the second aspect, but furthermore wherein the supplemental information contains information suggesting resource contents.

Information suggesting resource contents can be, for example, document titles and titles of chapters in a document.

The present invention in a ninth aspect is a link-processing device as described in the second aspect, but furthermore wherein the supplemental information contains information indicating the author of a resource.

The information indicating the author of a resource can be, for example, the name of the author or a company name.

The present invention in a tenth aspect is a link-processing device as described in the second aspect, but furthermore wherein the supplemental information contains audio information indicating a resource.

The audio information indicating a resource can be, for example, audio information for the title of the resource or the author.

The present invention in an eleventh aspect is a link-processing device as described in the second aspect, but furthermore wherein the supplemental information contains information indicating a copyright holder for a resource.

The information indicating a copyright holder can be, for example, "copyright FUJITSU".

The present invention in a twelfth aspect is a link-processing device as described in the second aspect, but furthermore wherein the supplemental information contains information indicating a trademark for a resource.

Information indicating a trademark for a resource can be, for example, "Fujitsu™ (Trademark)".

The present invention in a thirteenth aspect is a link-processing device as described in the second aspect, but furthermore wherein the supplemental information contains information added when a link is generated.

The information added when a link is generated can be, for example, notes added by the user generating the link or application information added by the application handling link generation.

The present invention in a fourteenth aspect is a link-processing device as described in the second aspect, but furthermore wherein the supplemental information contains information specific to a storage means for storing the resources.

The information can be, for example, copyright information if the database holding the resources automatically adds copyright information to acquired resources.

The present invention in a fifteenth aspect is a link-processing device as described in the second aspect, but furthermore wherein the first extracting means extracts a predetermined amount of information at the head of each of the acquired resources.

The predetermined amount to be extracted can be configured to suit. For example, it can be set to a user-defined amount or to an amount that can be held in a communication buffer.

The present invention in a sixteenth aspect is a link-processing device as described in the second aspect, but furthermore wherein first extracting means parses words from each of the acquired resources and extracts the parsing results.

For example, the words used in the resources can be parsed to build a keyword list, and the most frequently occurring words from the list can be extracted.

The present invention in a seventeenth aspect is a link-processing device as described in the second aspect, but furthermore wherein if the acquired resources include meta-information, the first extracting means extracts the meta-information.

"Meta-information" refers to information added before the body of a document. For example, with XML documents, meta-information can include the publisher, the title or the data of creation.

The present invention in an eighteenth aspect is a link-processing device as described in the second aspect, but furthermore wherein the first extracting means extracts the first information appearing in each of the resources, not including tags and attributes.

In other words, the first text data in a resource is extracted.

The present invention in a nineteenth aspect is a link-processing device as described in the second aspect, but furthermore wherein first extracting means reads style information associated with each of the acquired resources and uses the style information to extract data in tags specifying a maximum font size in each of the resources.

In other words, text data indicating the maximum font size is extracted from each resource.

The present invention in a twentieth aspect is a link-processing device as described in the second aspect, but furthermore wherein first extracting means stores predetermined keywords and, if the acquired resources include a tag name containing any of the keywords, extracts information contained in the tags.

For example, words such as "title," "abstract," "important items" and "emphasis" can be registered as keywords. Each resource is searched for tags containing any of these keywords. If a matching tag is found, the text data in the tag is extracted.

The present invention in a twenty-first aspect is a link-processing device as described in the second aspect, but furthermore wherein if information used to generate links is contained in the acquired resources, the first extracting means extracts the information used to generate links.

For example, locator information for other resources embedded in the resource can be extracted.

The present invention in a twenty-second aspect is a link-processing device as described in the second aspect, but furthermore wherein outputting means further includes means for setting which handles timing settings for outputting information extracted by first or second extracting means.

The setting means handles a setting that determines whether or not to output extracted information at the same time that the resource display object is displayed. If the two are not to be output at the same time, it would be possible to have the extracted information output when, for example, the cursor is positioned over the resource.

The present invention in a twenty-third aspect is a link-processing device as described in the second aspect, but furthermore wherein outputting means detects a cursor position over the displayed resource and outputs the extracted information based on the detection results.

For example, if the cursor is detected at a position in the link region of the resource, a balloon can be displayed.

The present invention in a twenty-fourth aspect is a link-processing device as described in the second aspect, but furthermore wherein outputting means further includes means for generating windows displaying a new window separate from a window in which the resource is displayed and outputting the extracted information in the new window.

The window-generating means generates a new window separate from the window in which the resource is displayed, and displays information extracted by first and second extracting means or a list of extracted information in the generated window. A single window can be used to display lists of extracted information for each resource, or separate windows can be displayed for each resource.

The present invention in a twenty-fifth aspect is a link-processing device as described in the second aspect, but furthermore wherein outputting means further includes means for generating frames displaying a new frame either by splitting a window in which the resource is displayed or by creating a new window, and outputting the extracted information in the frame.

The frame generating means splits the window in which the resource is displayed to create a frame. A frame can be displayed by creating a new window rather than using the window in which the resource is displayed. The extracted information or a list of extracted information can be output in the new frame.

The present invention in a twenty-third aspect is a link-processing device as described in the second aspect, but further includes means for generating balloons displaying a balloon in a window in which the resource is displayed and outputting the extracted information into the balloon.

The balloon-generating means generates a balloon in the window in which the resource is displayed. Extracted information from the first or second extracting means or a list of extracted information is displayed in the generated window.

The present invention in a twenty-seventh aspect is a link-processing device as described in the second aspect, but further includes means for controlling displays outputting the extracted information in a display format different from the resource display object.

For example, the extracted information can be displayed in various ways, such as in italics or boldface, or in a different color.

The present invention in a twenty-eighth aspect is a computer-readable recording medium on which is recorded a program for processing links in structured documents used in display devices capable of displaying structured documents structured based on predetermined structural elements. A program for processing links for executing the following steps A–E is recorded on the computer-readable recording medium.

(A) a step for acquiring structured information containing link-generating information and predetermined supplemental information, the link-generating information being used to generate links between information resources (hereinafter referred to as resources) out of a set of information resources in the form of all or part of said structured documents or non-structured documents, and the predetermined supplemental information indicating characteristics of the resources;

(B) a step for handling a setting for determining whether or not to acquire all of the resources, acquiring at least one resource based on the setting, and sending one of the acquired resources to the display device to be displayed;

(C) a step wherein, if all of the resources have been acquired, at least a section of each of the resources other than the displayed resource is extracted and/or at least the supplemental information of each of the resources other than the displayed resource is extracted from the structured information;

(D) a step wherein, if one of the resources is acquired, at least the supplemental information of each of the resources other than the acquired resource is extracted from the structured information; and (E) a step for visually outputting the extracted section of the resource and/or the supplemental information.

Thus advantages similar to those of the invention in its above-described second aspect are achieved.

The foregoing and other objects, features, aspects and advantages of the present invention will become more apparent from the following detailed description in conjunction with the accompanying drawings.

BRIEF DESCRIPTION OF THE DRAWINGS

FIG. 2 is an example of a structured document XML1 containing link-generating information and supplemental information;

FIG. 3 is an example of a structured document XML3, in which is a resource;

FIG. 4 is diagram illustrating a log list;

FIG. 5 depicts examples of embedded display of extracted information including supplemental information (a), and part of a resource (b);

FIG. 7 depicts another example of extracted information displayed window form, wherein (a) and (b) are the display states respectively before and after the window is displayed;

FIG. 10 depicts examples of extracted information displayed as lists (a) wherein locator information and multiple items of supplemental information are displayed, and (b) wherein locator information and call-up count are displayed;

FIG. 11 is a diagram depicting examples of different display methods;

FIG. 13 depicts a conventional link in a display window.

DETAILED DESCRIPTION OF THE PREFERRED EMBODIMENTS

The following is a detailed description of the link-processing device according to the present invention, with references to sample embodiments. The following embodiments present examples in which XML (extensible Markup Language) is used as the language for describing links and resources.

First Embodiment

Figure 1:
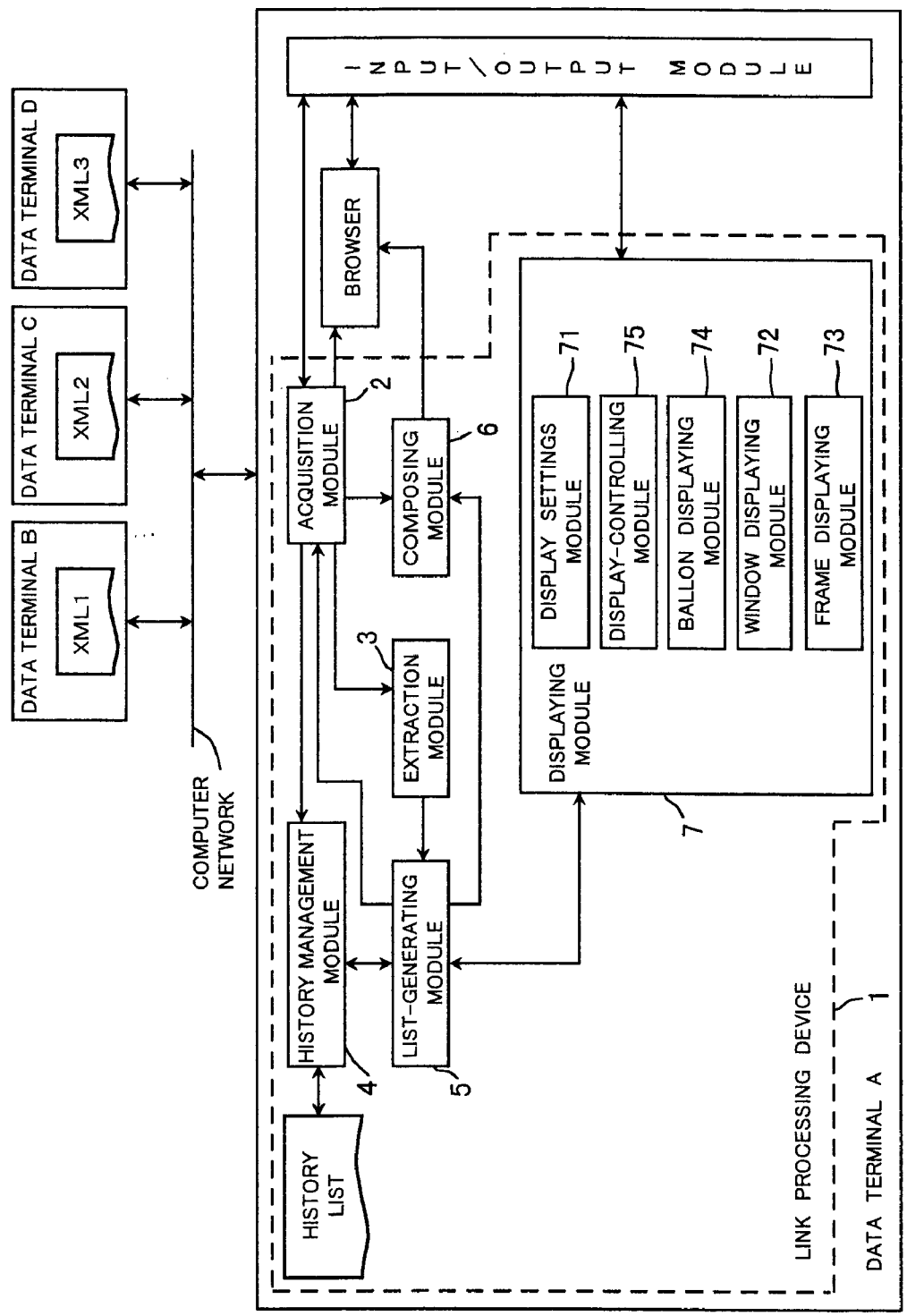
FIG. 1 is a functional block diagram of a link-processing device in accordance with the present invention.

FIG. 1 shows a functional block diagram of a link-processing device according to a first embodiment of the present invention. A link-processing device 1 shown in FIG. 1 is provided in a user data terminal A, and operates together with a browser that enables XML documents acquired by the link-processing device 1 to be displayed on a screen. The data terminal A is also connected via a computer network to other data terminals B, C, D and data can be sent and received between the terminals.

Overall Structure

The link-processing device 1 includes: a acquisition module 2, an extracting module 3, a log administration module 4, a list-generating module 5, a composition module 6, and a displaying module 7.

(1) Acquisition Module

The acquisition module 2 receives user-designated structured documents, and acquires structured information including link-generating information and supplemental information for each resource. The structured information acquired according to the user designation can be: a so-called out-of-line link and be an XML document independent from resources; a so-called in-line link and be embedded in a resource; or the so-called out-of-line link and be described at the beginning or the end of a structured document text and be a resource. In this example, the structured document information will be an XML document (hereinafter referred to as XML1) that is independent from the resource. FIG. 2 shows a conceptual drawing of the structured document XML1, which contains link-generating information and supplemental information.

Figure 8:
FIG. 8 depicts examples of extracted information displayed in frame forms (a) wherein the frame is embedded, (b) wherein the frame is displayed in a resource window, and (c) wherein the frame is displayed in a separate window from the resource.

The link-generating information is information needed for generating links between resources and contains at least locator information indicating the location of a resource. In addition, information such as the timing at which the resource is displayed and how the resource is displayed can be included. FIG. 8 illustrates various examples of how the resource can be displayed. As an example of display timing, if a source document is linked via an out-of-line link to a resource that is another source document, when a user opens either source document, the other (the linked resource) might open simultaneously, or might open when the user "clicks on" the link resource. This would be according to link-generating information on displaying the linked resource(s).

The supplemental information indicates the characteristics of the resource and is described in each of the resources. The supplemental information describable in the structured document XML1 is configured beforehand taking user needs into consideration. Examples of supplemental information that can be used include information about the meaning of the linked resource, specifically, information indicating reference links and cross-reference links. Other examples include the title for the document or chapter in the resource, the author of the resource, the holder of the copyright or trademark to the resource, other information added when the user or application generates the link, information specific to the database in which the resource is stored, and audio data relating to these items. Information specific to the database can include, for example, copyright and trademark information if copyright information or trademark information is to be always added to an acquired resource. Also, information relating to access rights can be used as supplemental information. For example, user names and group names having access rights (e.g., "department head", "section head") can be included as supplemental information.

When the structured document XML1 is acquired, the acquisition module 2 obtains the link-generating resource and determines which of the resources is to be displayed. The acquired resources will differ depending on the setting/configuration as to whether or not all the resources constituting the links are to be acquired. The configuration can be pre-set in the link-processing device 1 or can be set by the user. If the configuration indicates that all the linked resources are to be acquired and if the link-generating information specifies automatic display upon linking, the acquisition module 2 determines that the resource is to be displayed. If the configuration indicates that all the resources are to be acquired but if none of the resources is set to be displayed automatically, the acquisition module 2 selects one of the acquired resources and displays it. The selected resource can be, for example, the first resource described in the link-generating information.

If the setting does not indicate that all the linked resources are to be acquired, the acquisition module 2 selects and acquires one of the resources and displays the acquired resource. The acquired resource can be, for example, a resource that is specified for automatic display upon linking, or can be the resource described first in the link-generating information. In the following description, it is assumed that the structured document XML2 has been selected as the resource display object.

As described later, the acquisition module 2 receives notification from the list-generating module 5 if one of the resources not pre-selected to be displayed is designated by the user. If the acquisition module 2 has not already acquired the selected resource, it acquires the resource and sends the selected resource to the browser to be displayed.

(2) Extraction Module

Wherein all the resources have been acquired, the extracting module 3 (1) extracts partial information from each resource other than the resource XML2 display object and/or (2) extracts from the structured document XML1 supplemental information and link-generating information for each resource apart from the resource XML2 display object. Whether information is to be extracted from resources, from the structured document XML1, or both can be configured by the user or can be pre-set in the link-processing device 1. If multiple types of supplemental information are included in the structured document XML1, the supplemental information to extract can be configured to suit beforehand (as a default setting) or can be configured by the user. The extracting module 3 can extract link-generating information from the structured document XML1 as well as supplemental information. In this embodiment, locator information is extracted from the link-generating information and used as an index to the supplemental information.

FIG. 3 shows an example of a resource in the form of a structured document XML3. The structured document XML3 is composed of meta-information sections and main body sections. In the structured document XML3 shown in FIG. 3, the information to extract can be, for example, a fixed quantity of information from the head of the document. The extract quantity can be given, for example, by extracting a display quantity that has been set by configuring in advance as a default setting the quantity of display information to be extracted; by making it the quantity that can be stored in a communication buffer; or by enabling the user to set the quantity.

Also, the words contained in the document can be parsed to generate a keyword list, and the most frequently appearing words from the list can be extracted. Of course, all or some of the words from the list can also be extracted. It would also be possible to extract for example publisher, title, author, and date of creation contained in the meta-information indicated in FIG. 3. Furthermore, it would also be possible to extract the first information appearing in the document that is not a tag or an attribute, i.e., the first text information. In the example shown in FIG. 3, the first text information would be "Structured Document Processing" following the <title> tag.

The extracting module 3, by referring to a style sheet designated in the resource or to a user-defined style sheet, may extract character data described in a tag in which the largest font size in the resource is designated. Also, the extracting module 3 can register keywords such as "title", "emph", and "caution" beforehand. The extracting module 3 in this case searches the resource for tag names that contain any of these keywords and if a matching tag is found, the corresponding tagged character data is extracted. In the example shown in FIG. 3, the tags <title>, <emph>, and <caution> would match. Furthermore, if an "in-line link" is formed in which link-generating information is embedded in the resource, the extracting module 3 can, for example, extract locator information from the embedded link-generating information.

When one of the resources is acquired, the extracting module 3 extracts supplemental information from the structured document XML1 relating to the resources other than the acquired resource. If the structured document XML1 contains multiple types of supplemental information, the supplemental information to be extracted can be set beforehand or can be set by the user as described above.

Once the extracting module 3 extracts information from resources and the structured document XML1, the extracted information and the resource locator information are correlated and sent to the list-generating module 5. The extracting module 3 for example extracts the resource locator information from the link-generating information, and the resource title and author as supplemental information, coordinates the resource locator information with the supplemental information, and sends the coordinated data to the list-generating module 5.

(3) Log administration Module

The log administration module 4 creates and manages a log list in which locator information, number of call-up times, and display status for the resource are coordinated. FIG. 4 depicts a conceptual diagram of a log list created by the log administration module 4. In the log list shown in FIG. 4, the resources indicated by the locator information "uri1" and "uri2" are currently displayed and the number of call-up times for each is a total of 1 times. The resource indicated by the locator "uri3" is not currently being displayed and has not been called up at all. In response to a request from the list-generating module 5, the log administration module 4 sends the list-generating module 5 the number of times the requested resource has been called up. Furthermore, as described later, when the log administration module 4 receives notification from the acquisition module 2 of a resource specified by the user for display, the call-up count for the indicated resource is incremented and the display status is changed.

(4) List-Generating Module

The list-generating module 5 receives notification from the extracting module 3 of the information extracted from the supplemental information in the structured document XML1 and the resources, as well as the resource locator information. The list-generating module 5 notifies the log administration module 4 of the locator information for which it has received notification and obtains the call-up count for the resources from the log administration module 4. The list-generating module 5 then generates an information list in which the extracted information is coordinated with the call-up count. This information list is sent to the composition module 6 or the displaying module 7. The destination in this case depends on a setting indicating how the extracted information is to be displayed. This setting can be handled through a display settings module 71, as described later, or it can be set beforehand in the link-processing device 1. A setting indicating whether the call-up count is to be included in the information list can be changed as desired, or the user can be allowed to make the setting. The information list sent from the list-generating module 5 can be displayed by the composition module 6, as described later, so that it is embedded in the resource display object, or it can be displayed by the displaying module 7 in various forms such as via a window, a frame, or a balloon. Also, when a resource is selected from a displayed list, the list-generating module 5 notifies the acquisition module 2 of the selected resource.

(5) Composition Module

The composition module 6 inserts the information list received from the list-generating module 5 into the link section of the resource XML2 display object. The composed data is sent to the browser. FIG. 5 depicts sample screens displaying the extracted information embedded in a display object from the resource XML2. FIG. 5 (*a*) depicts an example in which a copyright notice is embedded in a link in the XML2 resource display object. FIG. 5 (*b*) depicts the first portion of a link destination resource embedded in a link in the resource display object.

(6) Displaying Module

The displaying module 7 includes the display settings module 71, a window-displaying module 72, a frame-displaying module 73, a balloon-displaying module 74, and a display-controlling module 75. The displaying module 7 visually outputs the information list received from the list-generating module 5 to a screen or the like. The user sees the displayed information list and can determine the type of resource before the resource is displayed.

The display settings module 71 accepts settings as to whether an information list is to be displayed simultaneously with the foregoing resource displayed object. If the information list is not to be displayed at the same time as the resource display object, then the information list could be displayed, for example, when the cursor is positioned at the link to the resource. The display settings module 71 also accepts settings as to whether the information list will be in an embedded display, in a window, in a frame, or in a balloon, and notifies the list-generating module 5 of this setting.

Figure 6:
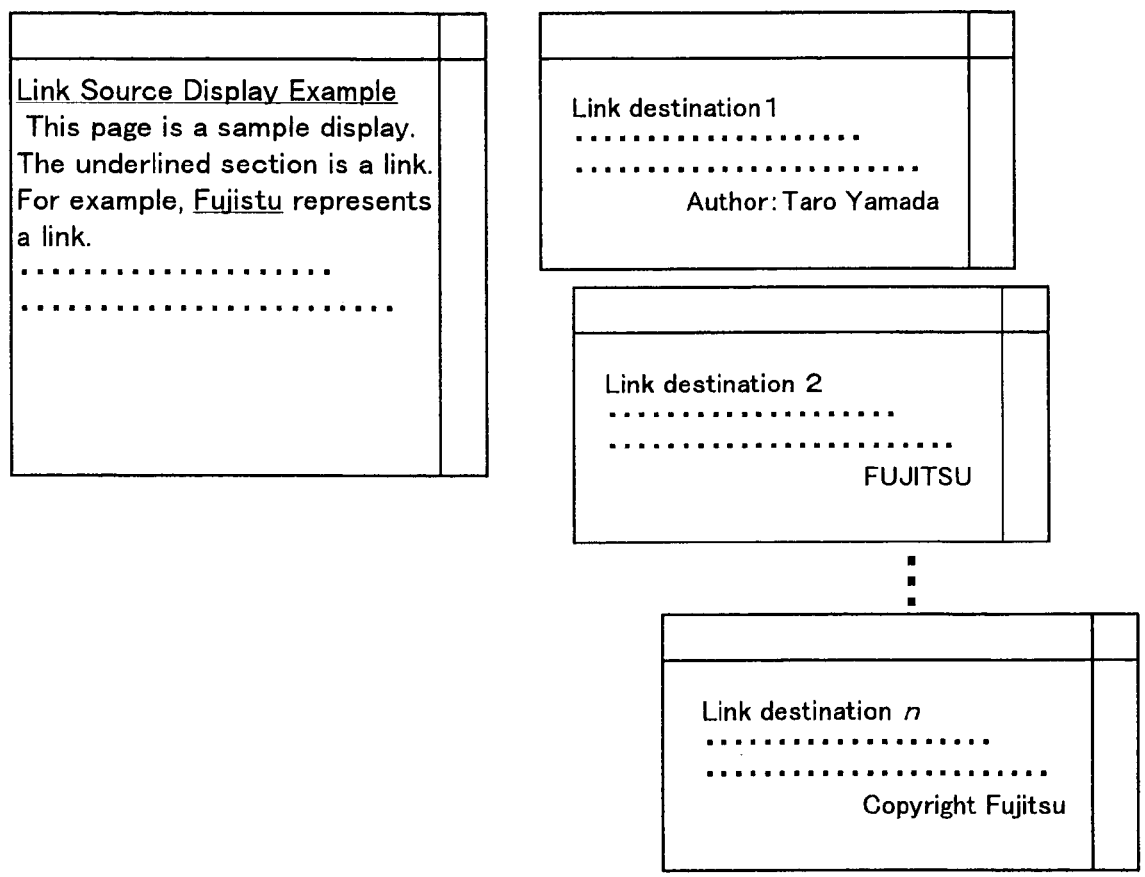
FIG. 6 depicts examples of extracted information displayed in window form.

The window-displaying module 72 generates a new window separate from the window showing the resource XML2 display object. The information list received from the list-generating module 5 is displayed in the new window. In FIG. 6 example windows displayed by the window-displaying module 72 are depicted. FIG. 6 illustrates examples in which information lists for each resource are displayed in separate windows, simultaneously with displaying of the display object from the resource XML2. FIG. 7 depicts another example of a window displayed by the window-displaying module 72. FIG. 7 (*a*) depicts the situation wherein no information list window is displayed when the resource XML2 display object is displayed. FIG. 7 (*b*) depicts the situation wherein a window displaying the information list is shown when the cursor is positioned at a link in the resource XML2 display object.

The frame-displaying module 73 displays a frame and displays the information list received from the list-generating module 5 in the frame. The frame is displayed either by splitting the window displaying the resource XML2 display object or by creating a new window. Examples of frames displayed by the frame-displaying module 73 are shown in FIG. 8, which includes an example screen in which an information list is presented wherein the resource XML2 display object is being displayed and the cursor is positioned at a link in the resource XML2.

FIG. 8 (*a*) depicts the original screen, where only the resource XML2 display object is displayed. FIG. 8 (*b*) depicts a display example in which a frame is embedded in a link in the resource XML2. FIG. 8 (*c*) depicts a display example in which frames are created in the resource XML2 window and information relating to the resources is displayed in each of the frames. FIG. 8 (*d*) depicts an example wherein a new window is created and frames are displayed, with information relating to the resources being displayed in each of the frames. If a setting indicates that the resource display object and the information list are to be displayed at the same time, the frames shown in FIG. 8 (*b*)–(*d*) can be displayed at the same time as the resource XML2.

Figure 9:
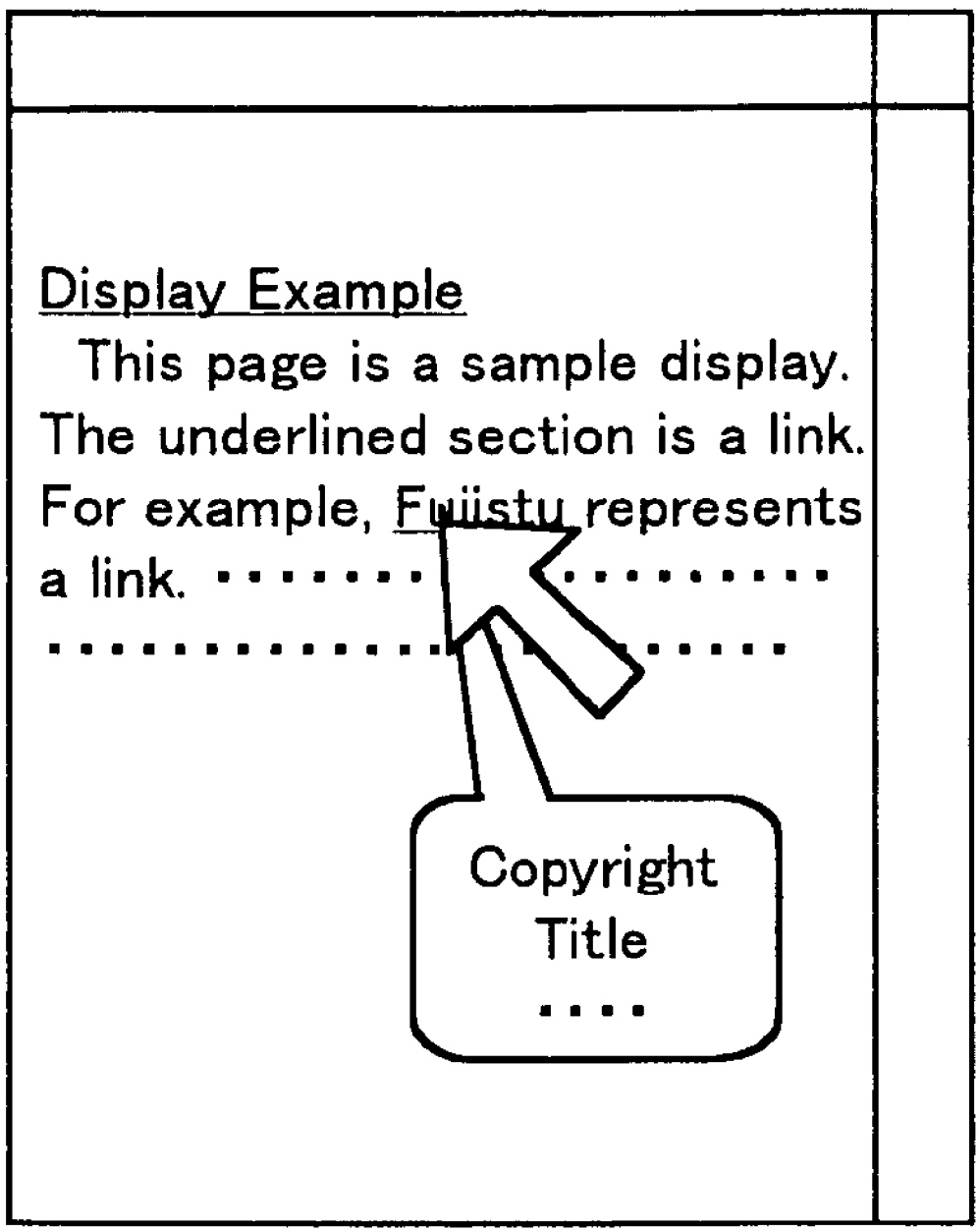
FIG. 9 is an example of extracted information displayed in a balloon.

The balloon-displaying module 74 displays a balloon in the window containing the display object from the resource XML2 and outputs the information list received from the list-generating module 5 in the balloon. FIG. 9 shows an example of a balloon displayed by the balloon-displaying module 74. In the example shown in FIG. 9, the information list is displayed in a balloon when the cursor is positioned at a link in the resource XML2 display object.

In the examples shown in FIG. 6 through FIG. 9, information about a single resource is displayed in a single window, frame, or balloon. However, it would also be possible to use other methods of displaying. For example, as shown in FIG. 10 (*a*) and (*b*), a single window can be used to display a list in which locator information for resources is displayed in association with the nature of the link, the author, the call-up count, and the like. The information sets displayed in FIG. 6 through FIG. 10 are based on configuration data extracted from the structured document XML1 and the resources.

The display control module 75 displays the information list so that it can be distinguished from the resource XML2 display object, e.g., by displaying in italic, bold, or in a different font color. FIG. 11 depicts an example in which the information list is displayed by the display control module 75 in italics.

With the information lists displayed by the composition module 6, the window-displaying module 72, the frame-displaying module 73, and the balloon-displaying module 74, individual resources can be selected in the following manner. In one method, resource selection is handled by having a separate resource selection window displayed by performing an operation such as double-clicking a mouse button on a link in the resource XML2 display object. In another method, resource selection is handled through the information list displayed as described above. In either case, the list-generating module 5 is notified of the selected resource and the resource is displayed by the browser.

Flow of Operations

Figure 12A:
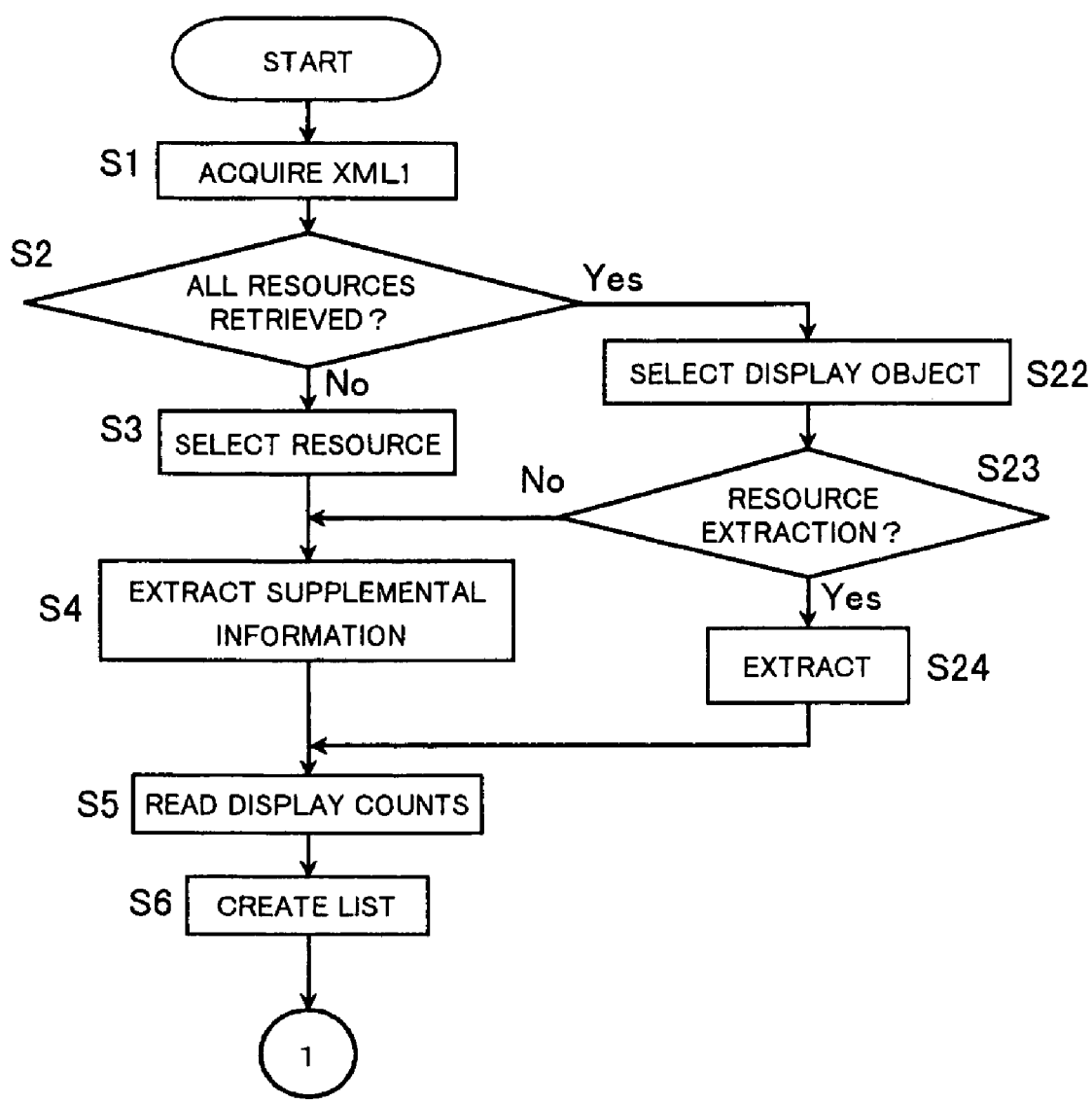
FIGS. 12A and 12B constitute a flowchart diagramming process flow of operations performed by a link-processing device in accordance with the present invention.
Figure 12B:
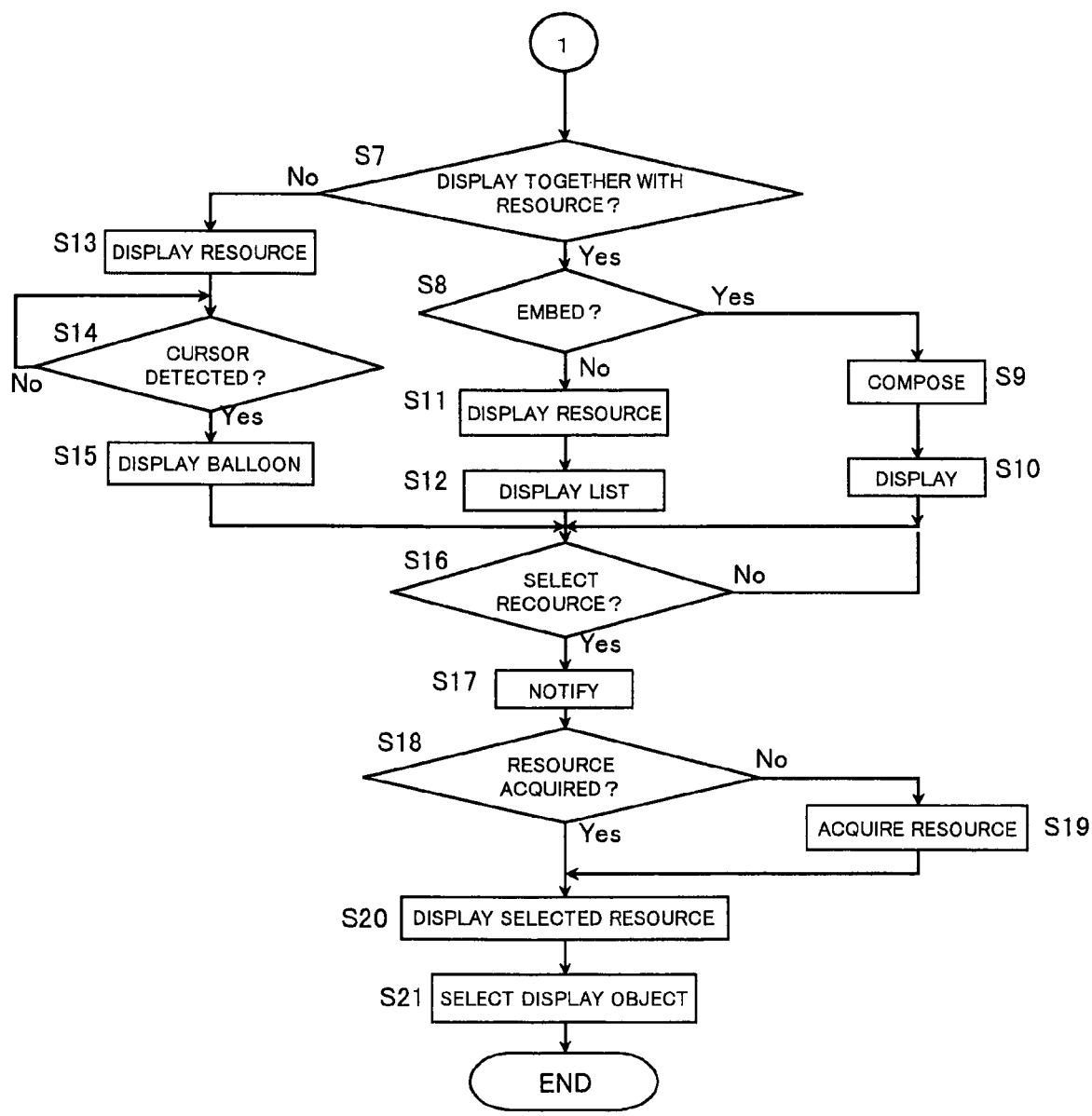

The following is a description of the operations performed by the link-processing device 1 according to this embodiment. FIG. 12 is a flowchart flow of processes executed by the link-processing device 1 according to this embodiment. To simplify the description, it is assumed that structured documents XML2 and XML3 are described as linked resources in the structured document XML1.

First, at step S1, the acquisition module 2 acquires the structured document XML1 from the data terminal B on the network based on user instructions. The structured document XML1 contains link-generating information as well as supplemental information.

At step S2, the acquisition module 2 determines whether a setting indicates that all the linked resources (XML2, XML3) are to be acquired. If the setting indicates that all the resources are to be acquired, the process flow is to step S22 described later. Otherwise, the process flow is to step S3.

At step S3, the acquisition module 2 selects either the linked resource XML2 or XML3 as the resource display object and acquires the resource. For example, the resource XML2, whose link-generating information is set to "automatic display upon linking," is acquired.

At step S4, the extracting module 3 extracts from the structured document XML1 predetermined supplemental information and locator information for resources other than the acquired resource XML2, i.e., resource XML3. The extracted information is sent to the list-generating module 5.

At step S5, the list-generating module 5 informs the log administration module 4 of the locator information for the XML3. The log administration module 4 uses the received locator information to read the number of times the extracted XML3 was called up and the two are coordinated and sent to the list-generating module 5.

At step S6, the list-generating module 5 generates an information list in which the supplemental information from the XML3, the call-up count, and the locator information are associated.

At step S7, the list-generating module 5 determines if there is a setting indicating that the acquired resource XML2 is to be displayed along with the generated information list. To simplify the description, this embodiment embeds the information list or displays it in a window or a frame if the information list is to be displayed at the same time as the acquired resource XML2. The process flow is then to step S8. If the two are not to be displayed at the same time, the information list will be displayed when the cursor is positioned on the resource. In this case, the information list will be displayed in a balloon and control proceeds to step S13, described later.

At step S8, the list-generating module 5 determines if the display method for the information list is set to embedded display. If embedded displaying is to be executed, the process flow is to step S9. If window or frame displaying is set, the process flow is to step S11, described later.

When the process flow is to step S9 in response to the embedded display setting, the composition module 6 acquires the information list from the list-generating module 5 and acquires the resource XML2 from the acquisition module 2 The composition module 6 inserts the information list into the link section of the resource XML2 and creates composite data from the structured document XML2 and the information list.

At step S10, the data composed by the composition module 6 is sent to the browser and displayed. The process flow is then to step S16, described later.

If, at step S8, the list-generating module 5 determines that window displaying or frame displaying is set, the process flow is to step S11. At step S11, the list-generating module 5 instructs the acquisition module 2 to send the resource XML2 to the browser, and the resource XML2 is displayed.

At step S12, the list-generating module 5 sends the information list to the displaying module 7. The information list is received and displayed according to the display method setting.

If, at step S7, the list-generating module 5 determines that the resource XML2 and the information list are not to be displayed at the same time, the process flow is to step S13. At step S13, the list-generating module 5 instructs the acquisition module 2 to send the resource XML2 to the browser, and the resource XML2 is displayed.

At step S14, the balloon-displaying module 74 waits for the cursor to be positioned at a link region in the resource XML2. When the cursor is positioned at the link region, the process flow is to step S15.

At step S15, the balloon-displaying module 74 displays a balloon, and an information list is displayed in the balloon. The process flow is then to step S16.

At step S16, the displaying module 7 waits for one of the resources in the displayed information list to be selected. When selection of one of the resources is detected, the list-generating module 5 is notified of the selected resource and the process flow is to step S17.

At step S17, the list-generating module 5 notifies the acquisition module 2 of the reported resource locator information.

At step S18, the acquisition module 2 determines whether the reported resource has already been acquired or not. If it has already been acquired, the process flow is to step S20; if not, the flow is to step S19.

At step S19, the acquisition module 2 acquires the reported resource.

At step S20, the acquisition module 2 sends the resource selected by the user to the browser, where it is displayed.

At step S21, the acquisition module 2 notifies the log administration module 4 of the locator information for the displayed resource. After receiving this notification, the log administration module 4 increments the call-up count for the resource and changes the display status from "non-displayed" to "displayed".

If, at step S2, the acquisition module 2 determines that all resources are to be acquired, the process flow is to step S22. At step S22, the acquisition module 2 selects a resource display object out of the linked resources. For example, the resource XML2, set to be displayed automatically when linked, is selected to be displayed.

At step S23, the extracting module 3 determines whether to extract information from the resources other than the resource XML2 display object, i.e., resource XML3. In this embodiment, the information extracted from the resource or the supplemental information is displayed, but it would also be possible to display both, as described above. Wherein the link-processing device 1 has been configured to extract from the resource, the process flow is to step S24. If it has been configured to extract data from the supplemental information, the process flow is to step S4 described above.

At step S24, the extracting module 3 extracts predetermined information from the resource XML3, and sends 15; the extracted information to the list-generating module 5. Then, the operations described for step S5 are performed. However, at step S18, the acquisition module 2 has acquired all the resources, so the resource selected by the user does not need to be acquired again and can be displayed immediately.

Other Embodiments (a) In the first embodiment described above, the description uses links in a structured document as an example. However, as described above, resources do not need to be limited to structured documents and can include non-structured documents such as standard text data and bitmap data. The foregoing link-processing device 1 can operate in a similar manner as described above even if non-structured data serves as the resources. However, if all the resources are non-structured documents, the structured information containing link-generating information and the like is set up as an independent structured document. If any of the resources are non-structured documents, the structured information must be embedded or described in a resource that is a structured document, or the structured information must be set up as a structured document independent from all the other resources.

(b) In the first embodiment described above, when a selected resource is displayed, it is assumed that it was called up, and the call-up count is increased. In addition, resource references may include cases wherein a part of the resource is extracted and displayed, or wherein the resource is both selected and acquired. Also, wherein calling up a resource includes display of a section extracted from the resource, it would be possible not to increase the call-up count wherein the display object from the resource is displayed at the same time as the extracted section, while increasing the call-up count wherein the extracted section is displayed in cases such as when the cursor is positioned on a link in the resource display object.

Using the present invention, a summary of a link destination resource is displayed before the resource is displayed. The user is able to easily determine whether the information is needed or not, thus enabling efficient acquisition of desired information.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A document link-processing method utilized in a display device capable of displaying a structuralized document based on predetermined structural elements, the link-processing method comprising:

acquiring structured information containing links to resources serving as information sources, the resources comprising said structured document or a part thereof and/or comprising other structured or non-structured documents, and the structured information containing information indicating characteristics of said resources;

storing a setting for: determining whether all of said resources are to be automatically acquired, acquiring at least one resource when all are not acquired, and sending to and displaying in said display device any said acquired resources;

acquiring, without user input, at least one resource determined to be displayed when the structured document is displayed;

simultaneously displaying in the display device the at least one acquired resource and the structured document;

when the setting indicates that all of said resources are to be acquired, for each non-displayed resource, either (1) extracting at least a part of such resource, or (2) extracting from said structured information at least said information indicating characteristics of said resources for such resource;

when the setting indicates that not all but rather any resource is to be acquired, extracting from said structured information at least said information indicating characteristics of said resources for resources other than said acquired resource; and while displaying the structured document, visually outputting said extracted resource part and/or said extracted information indicating characteristics of said resources for each resource that is not displayed with said structured document.

2. In a structured document link-processing device utilized in a display device capable of displaying a document structuralized based on predetermined structural elements, a resource-information display device comprising:

a first acquisition unit to acquire structured information containing links to resources serving as information sources, the resources comprising said structured document or a part thereof and/or comprising other structured or non-structured documents, and the structured information containing information indicating characteristics of said resources;

a second acquisition unit to store a setting for: determining whether all of said resources are to be automatically acquired, acquiring at least one resource, and sending to and displaying in said display device any said acquired resources;

a third acquisition unit to acquire, without user input, at least one resource determined to be displayed when the structured document is displayed;

a display unit to simultaneously display in the display device the at least one acquired resource and the structured document;

a first extracting unit to, when the setting indicates that all of said resources are to be acquired, for each non-displayed resource, either (1) extracting at least a part of such resource, or (2) extracting from said structured information at least said information indicating characteristics of said resources for such resource;

a second extracting unit to, when the setting indicates that not all but rather any resource is to be acquired, extracting from said structured information at least said information indicating characteristics of said resources for resources other than said acquired resource; and an output unit to, while displaying the structured document, visually output said extracted resource part and/or said extracted information indicating characteristics of said resources for each resource that is not displayed with said structured document.

3. A link-processing device as set forth in claim 2, further comprising a composing unit to compose information extracted by said first or said second extracting unit with said resource being displayed and to send the composed information to said display device.

4. A link-processing device as set forth in claim 2, further comprising a selection unit to create, and to send to said outputting unit, a list of information extracted by said first or second extracting units, and for accepting a resource selection and reporting the selected resource to said second acquisition unit; wherein if the reported resource has not been acquired, said second acquisition unit acquires said resource, and sends the reported resource to said displaying device.

5. A link-processing device as set forth in claim 2, further comprising:

a storage unit to coordinate with each resource a call-up count of said resource and for storing the call-up count;

a log administration unit to send to said outputting unit said call-up counts for resources other than said resource being displayed, and to accept a resource selection, to notify said second acquisition unit of the selected resource, and to update the resource call-up count in said storing unit; Wherein if the reported resource has not been acquired from said log administration unit, said second acquisition unit acquires said resource, and sends the reported resource to said displaying device.

6. A link-processing device as set forth in claim 2, wherein said first and said second extracting units are capable of extracting said supplemental information together with said link-generating information.

7. A link-processing device as set forth in claim 2, wherein said supplemental information contains information indicating reference links and cross-reference links.

8. A link-processing device as set forth in claim 2, wherein said supplemental information contains information suggesting resource contents.

9. A link-processing device as set forth in claim 2, wherein said supplemental information contains information indicating resource author.

10. A link-processing device as set forth in claim 2, wherein said supplemental information contains resource-indicating audio information.

11. A link-processing device as set forth in claim 2, wherein said supplemental information contains resource copyright-holder indicating information.

12. A link-processing device as set forth in claim 2, wherein said supplemental information contains resource trademark-indicating information.

13. A link-processing device as set forth in claim 2, wherein said supplemental information contains optional information added in link generation.

14. A link-processing device as set forth in claim 2, wherein said supplemental information contains information specific to storage units wherein resources are stored.

15. A link-processing device as set forth in claim 2, wherein said first extracting unit extracts a predetermined amount of information from the head of said acquired resources.

16. A link-processing device as set forth in claim 2, wherein said first extracting unit parses terms from said acquired resources and extracts the parsing results.

17. A link-processing device as set forth in claim 2, wherein if said acquired resources include meta-information, said first extracting unit extracts said meta-information.

18. A link-processing device as set forth in claim 2,
wherein said first extracting unit extracts initial information apart from tags and attributes appearing among said acquired resources.

19. A link-processing device as set forth in claim 2, wherein said first extracting unit reads style information associated with said acquired resources and based on said style information extracts data described in tags designating maximum font size among said resources.

20. A link-processing device as set forth in claim 2, wherein said first extracting unit stores predetermined keywords and, if said acquired resources have a tag name containing any of said keywords, extracts information described in said tags.

21. A link-processing device as set forth in claim 2, wherein if information for generating links is contained in said acquired resources, said first extracting unit extracts said information for generating links.

22. A link-processing device as set forth in claim 2, wherein said outputting unit further includes a configuration unit accepting timing settings for outputting information extracted by said first or second extracting units.

23. A link-processing device as set forth in claim 2, wherein said outputting unit detects position of a cursor over said displayed resource and outputs said extracted information based on said detection results.

24. A link-processing device as set forth in claim 2, wherein said outputting unit further comprises a window unit to display a new window separate from a window wherein said resource is displayed and outputting said extracted information in the window.

25. A link-processing device as set forth in claim 2, wherein said outputting unit further includes a frame unit to display a new frame either by splitting a window, wherein the resource display object is displayed or by creating a new window, and to output said extracted information in said frame.

26. A link-processing device as set forth in claim 2, wherein said outputting unit further includes a balloon unit to display a balloon within a window wherein said resource is displayed and to output said extracted information in said balloon.

27. A link-processing device as set forth in claim 2, wherein said outputting unit further includes a display control unit to output said extracted information in a display form different from that of said resource being displayed.

28. A computer-readable recording medium on which is recorded a program for processing links in a structured document, used in display devices capable of displaying the structured document based on predetermined structural elements, the computer-readable recording medium on which is recorded the link-processing program for executing:

acquiring structured information containing links to resources serving as information resources, the set of resources comprising said structured document or a part thereof and/or comprising other structured or non-structured documents, and the structured information containing information indicating characteristics of said resources;

storing a setting for: determining whether all of said resources are to be automatically acquired, acquiring at least one resource when all are not acquired, and sending to and displaying in said display device any said acquired resources;

acquiring, without user input, at least one resource determined to be displayed when the structured document is displayed;

simultaneously displaying in the display device the at least one acquired resource and the structured document;

when the setting indicates that all of said resources are to be acquired, for each non-displayed resource, either (1) extracting at least a part of such resource, or (2) extracting from said structured information at least said information indicating characteristics of said resources for such resource;

when the setting indicates that not all but rather any resource is to be acquired, extracting from said structured information at least said information indicating characteristics of said resources for resources other than said acquired resource; and while displaying the structured document, visually outputting said extracted resource part and/or said extracted information indicating characteristics of said resources for each resource that is not displayed with said structured document.

* * * * *

UNITED STATES PATENT AND TRADEMARK OFFICE
CERTIFICATE OF CORRECTION

| | | |
|---|---|---|
| PATENT NO. | : 7,107,517 B1 | Page 1 of 1 |
| APPLICATION NO. | : 09/414942 | |
| DATED | : September 12, 2006 | |
| INVENTOR(S) | : Toshimitsu Suzuki et al. | |

It is certified that error appears in the above-identified patent and that said Letters Patent is hereby corrected as shown below:

Column 17, Line 56, change "Wherein" to --wherein--.

Signed and Sealed this

Sixth Day of March, 2007

JON W. DUDAS
*Director of the United States Patent and Trademark Office*